(12) United States Patent
Agrawal et al.

(10) Patent No.: US 10,803,726 B2
(45) Date of Patent: Oct. 13, 2020

(54) DEVICE NOTIFICATION FOR CLOTHING SELECTION INCOMPATIBLE WITH WEATHER

(71) Applicant: Motorola Mobility LLC, Chicago, IL (US)

(72) Inventors: Amit Kumar Agrawal, Bangalore (IN); Vishnu Kumar Shivaji Rao, Hillsborough, NJ (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/252,812

(22) Filed: Jan. 21, 2019

(65) Prior Publication Data

US 2020/0234556 A1  Jul. 23, 2020

(51) Int. Cl.
| | |
|---|---|
| *G08B 5/22* | (2006.01) |
| *G08B 25/00* | (2006.01) |
| *G08B 21/18* | (2006.01) |
| *G01W 1/02* | (2006.01) |
| *G01W 1/10* | (2006.01) |
| *H04W 4/30* | (2018.01) |

(52) U.S. Cl.
CPC .............. *G08B 21/18* (2013.01); *G01W 1/02* (2013.01); *G01W 1/10* (2013.01); *H04W 4/30* (2018.02)

(58) Field of Classification Search
CPC .......... G08B 21/18; G01W 1/02; G01W 1/10; H04W 4/30
USPC ......................................... 340/6.1
See application file for complete search history.

(56) References Cited

U.S. PATENT DOCUMENTS

2017/0277365 A1* 9/2017 Gaidar ................... G06F 3/167
2018/0364394 A1* 12/2018 Phillips .................. G01W 1/10

* cited by examiner

Primary Examiner — Tanmay K Shah
(74) Attorney, Agent, or Firm — Amerson Law Firm, PLLC

(57) ABSTRACT

A method includes receiving weather data in a device, identifying a clothing selection by a user in the device, and generating a first notification message on the device responsive to the clothing selection being incompatible with the weather data. A device includes a display and a processor coupled to the display to receive weather data, identify a clothing selection by a user, and generate a first notification message on the display responsive to the clothing selection being incompatible with the weather data.

15 Claims, 2 Drawing Sheets

DEVICE NOTIFICATION FOR CLOTHING SELECTION INCOMPATIBLE WITH WEATHER

BACKGROUND

Field of the Disclosure

The disclosed subject matter relates generally to mobile computing systems and, more particularly, to generating a notification in a device for a clothing selection incompatible with the weather.

Description of the Related Art

There are many places where weather is dynamic. In such places, extreme inclement weather may be present, and also the weather can vary greatly over a single day. People in these locations often have a difficult time selecting appropriate clothing, since the weather in the morning, when the weather is checked, may vary significantly than the weather later in the day.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical articles.

DETAILED DESCRIPTION OF EMBODIMENT(S)

Figure 1:
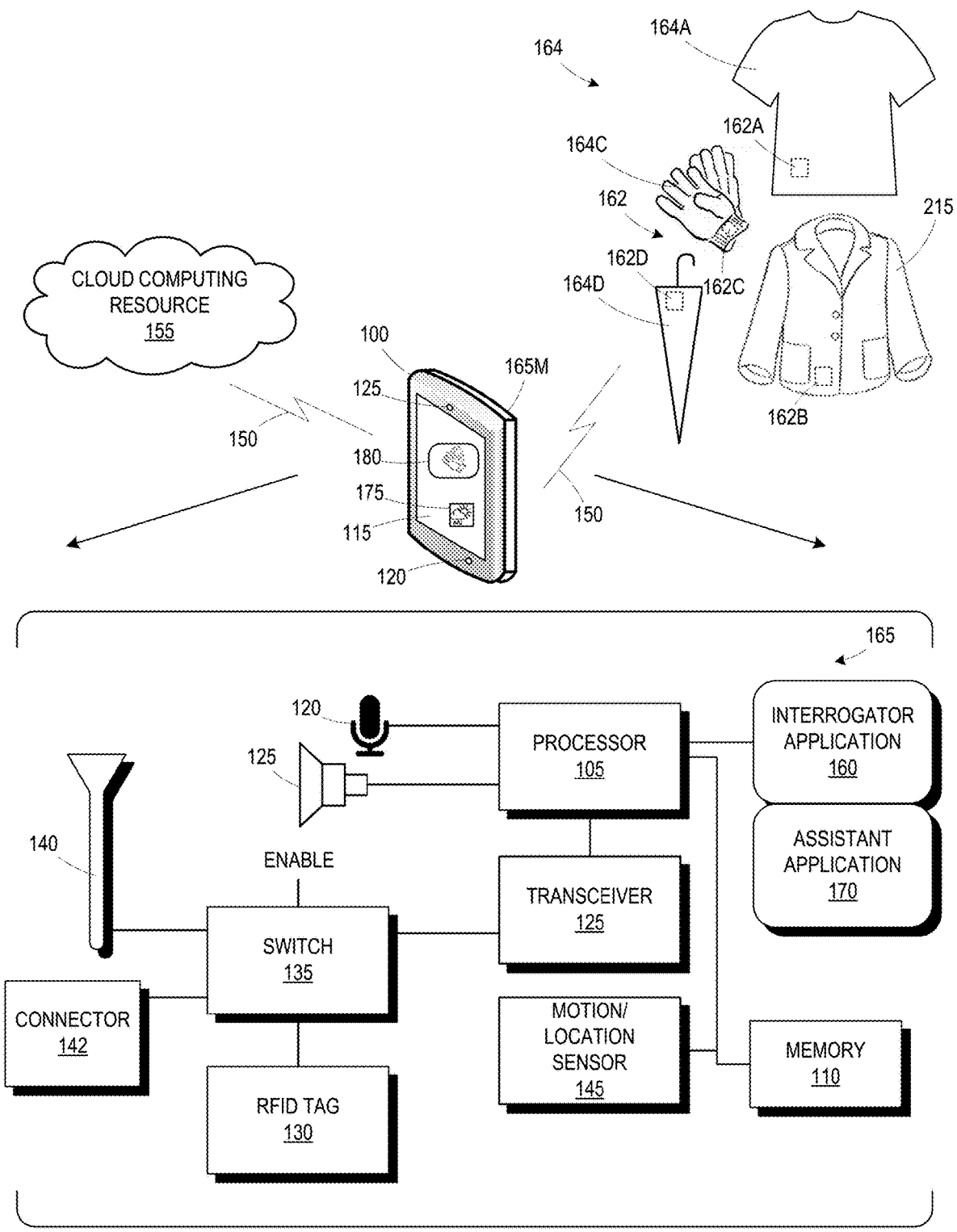
FIG. 1 is a simplified block diagram of a device operable to generate a notification for a clothing selection incompatible with the weather, in accordance with some embodiments.
Figure 2:
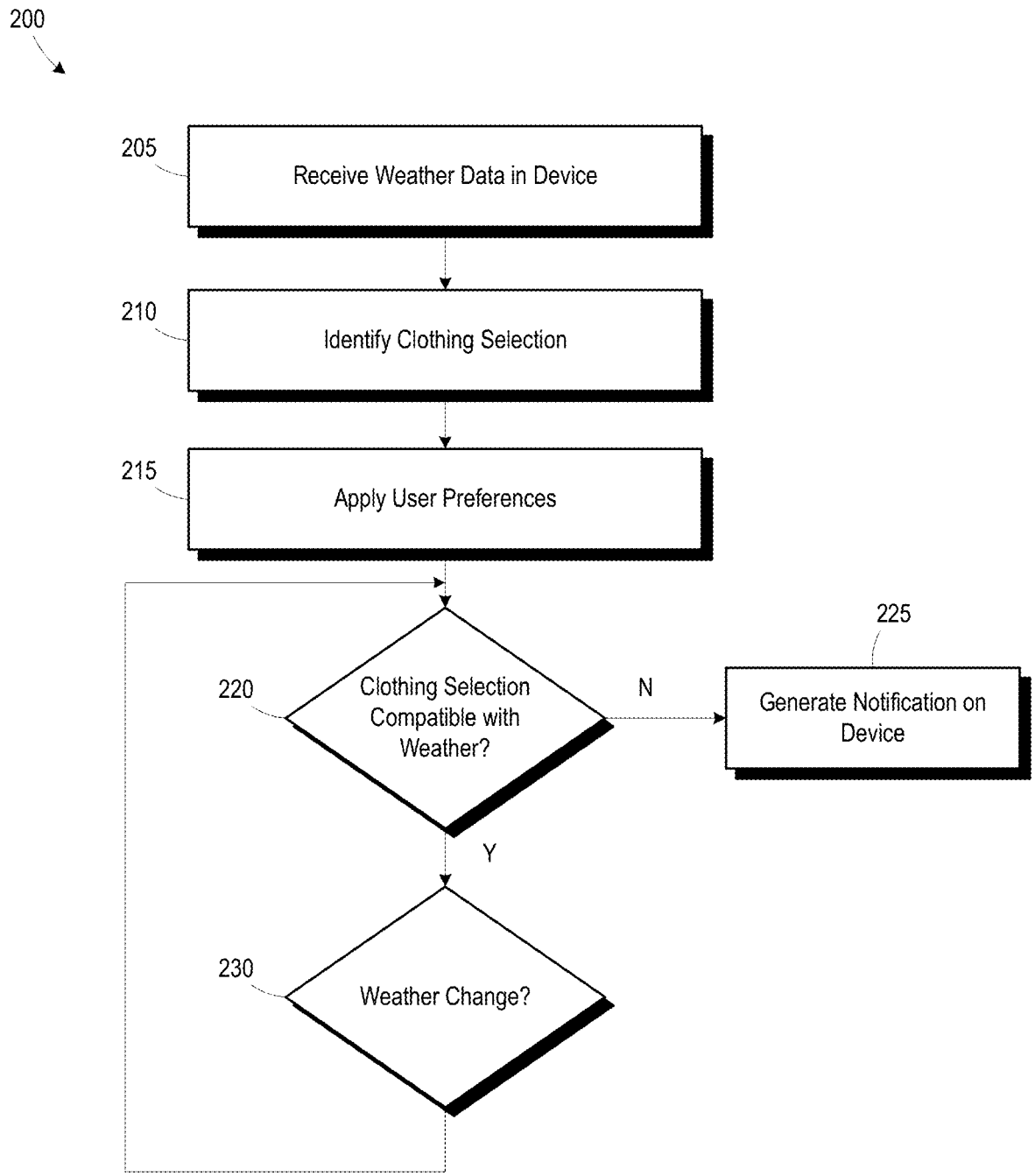
FIG. 2 is a flow diagram of a method for generating a notification for a clothing selection incompatible with the weather, in accordance with some embodiments.

FIGS. 1-2 illustrate example techniques for generating a notification for a clothing selection incompatible with the weather. For example, a device identifies a clothing selection of a user. The device receives weather data. The device generates a notification responsive to the clothing selection being incompatible with the weather data.

FIG. 1 is a simplistic block diagram of one illustrative example of a device 100 disclosed herein that includes, among other things, a processor 105, a memory 110, a display 115, a speaker 120, a transceiver 125, an identification tag 130 (e.g., a radio frequency identification (RFID) tag), a switch 135, an antenna 140, and a motion/location sensor 145 (e.g., accelerometer, magnetometer, mercury switch, gyroscope, compass, global positioning system (GPS) unit, or some combination thereof). The memory 110 may be a volatile memory (e.g., DRAM, SRAM) or a non-volatile memory (e.g., ROM, flash memory, hard disk, etc.). The transceiver 125 transmits and receives signals via the antenna 140 to implement identification tag reading functionality and to communicate with remote devices. The transceiver 125 may include one or more radios for communicating according to different radio access technologies and over multiple frequency bands (e.g., cellular, Wi-Fi, BLUETOOTH®, ZigBee, etc.) over a communication line 150. The communication link 150 may have a variety of forms. In some embodiments, the communication link 150 may be a wireless radio or cellular radio link. The communication link 150 may also communicate over a packet-based communication network, such as the Internet. In one embodiment, a cloud computing resource 155 may interface with the device 100 to implement one or more of the functions described herein. In various embodiments, the device 100 may be embodied in a handheld or wearable device, such as a laptop computer, a handheld computer, a tablet computer, a mobile device, a telephone, a personal data assistant, a music player, a game device, a wearable computing device and the like.

In the device 100, the processor 105 may execute instructions stored in the memory 110 and store information in the memory 110, such as the results of the executed instructions. Some embodiments of the processor 105 and the memory 110 may be configured to implement an interrogator application 160. The processor 105, memory 110, transceiver 125, and interrogator application 160 collectively define an interrogator 165. The particular software and signaling techniques for implementing the interrogator 165 are known to those of ordinary skill in the art, so they are not described in detail herein.

In some embodiments, one or more portions of the system illustrated in FIG. 1 may be housed in an interrogator module 165M that may be attached to the mobile device 100 as being opposed to being mounted within the mobile device 100. For example, a separate transceiver, antenna, identification tag, etc., for implementing the interrogator 165 may be housed in the interrogator module 165M and physically and electrically attached to the mobile device 100.

In some embodiments, the processor 105 executes the interrogator application 160 to query one or more identification tags 162, individually references as 162A-162D, affixed to various clothing items 164, such as a shirt 164A, a jacket 164B, gloves 164C, and an umbrella 164D. The clothing items 164 refer generally to items a user wears or accessories that are carries carried (e.g., the umbrella 164D). The particular clothing items 164 may vary depending on the user. In some embodiments, the user interacts with the assistant application 170 to generate an inventory list on the device 100 of clothing items 164 available to the user.

In general, identification tags 130, 162A-162D are passive devices that do not require a power source to function. An identification tag 130, 162A-162D includes non-volatile memory or logic that stores data and transmits the stored data using a backscattering modulation technique responsive to a query from an interrogator (e.g., the interrogator 165 reading the identification tag 162A-162D). The particular circuit elements for constructing identification tags 130, 162A-162D are known to those of ordinary skill in the art, so they are not described in detail herein. The switch 135 allows the identification tag 130 and the interrogator 165 to share the antenna 140 responsive to an enable signal. In some embodiments, separate antennas (not shown) may be provided.

Some embodiments of the processor 115 and memory 120 may be configured to implement an assistant application 170 to determine incompatibilities between clothing selections and weather data and generate notifications to the user. The assistant application performs portions of a method 200 shown in FIG. 2 and discussed below. One or more aspects of the method 200 may also be implemented using the cloud computing resource 155 in addition to the assistant application 170.

FIG. 2 is a flow diagram of a method 200 for generating a notification for a clothing selection incompatible with the weather, in accordance with some embodiments. In method block 200, the assistant application 170 receives weather data 175 (see FIG. 1). In some embodiments, the assistant application 170 retrieves the data, such as from the Internet. In some embodiments, the cloud computing resource 155 periodically pushes weather data to the assistant application 170. The weather data may include present weather data as well as forecast weather data for later time periods.

In method block 210, the assistant application 170 identifies a user's clothing selection. The identification of the clothing selection may occur in response to certain trigger events. In some embodiments, the assistant application 170 uses data from the motion/location sensor 145 to determine whether the user has left a designated location where the clothing items 164 are typically stored (e.g., home or office). According to some embodiments, the assistant application 170 determines that the user has not yet left the designated location if more than one clothing item 164 of a particular class (e.g., multiple coats, pairs of gloves, shirts, etc.) is detected. After making such a determination, the assistant application 170 may wait for a predetermined time period and repeat the identification of the user's clothing selection. In some embodiments, a trigger event is invoked responsive to the device 100 determining if it is stowed in a pocket of the user (e.g., using motion and/or ambient light data). In some embodiments, the trigger event is generated by the device 100 itself, such as the occurrence of a calendar event, a particular time, such as the time the user normally dresses or leaves the house, or a notification from a different application.

In some embodiments, the assistant application 170 employs the interrogator 165 to read identification tags 130, 162A-162D of clothing items 164 carried by the person. The signal strength of the interrogator 165 may be controlled to reject clothing items 164 not immediately proximate the user.

According to some embodiments, not all of the clothing items 164 may have identification tags 162. The assistant application 170 employs analyzes an audio signal from the microphone 120 to identify an audio signature. For example, particular clothing items, such as winter jackets, make a distinctive sound when picked up or worn by the user. In some embodiments, the assistant application uses the audio signature to identify that a particular clothing item is included in the clothing selection.

In some embodiments, the assistant application 170 may store an inventory list of the clothing items 164 for the user. Each clothing item 164 may have a type (e.g., jacket, headwear, gloves, short, pants, umbrella, etc.) and a weather rating (e.g., sunny, rainy, temperature rating, etc.) According to some embodiments, the assistant application 170 assigns a clothing profile to the selected clothing items 164 based on the types and weather ratings.

In method block 215, the assistant application 170 applies user preferences to the identified clothing selection to modify the clothing profile. In some embodiments, a particular clothing item 164 may have a default weather rating indicating a particular temperature rating. A particular user may have preferences that modify the default weather rating. For example, if a particular user prefers to be cooler than an average user, the user preference data may specify a lower temperature range for the particular item 164. The user may be queried over time regarding preferences, such as when incompatibility notifications are generated, as described below, or when the particular clothing item 164 is added to the inventory list.

Clothing profiles may include temperature grades, such as extremely hot, hot, moderately warm, moderately cold, cold, extreme cold, as well as condition modifiers, such as raining, snowing, windy, etc.

In method block 220, the assistant application 170 determines whether the clothing selection is compatible with the weather data. A weather profile may be generated based on the weather data. For example, the weather profile may be "cold and snowing". In some embodiments, the assistant application 170 maintains a list of weather profiles, each having clothing recommendations. Weather profiles with rainy condition modifiers may have an umbrella included as a designated item in the clothing recommendation, while weather profiles for cold ranges or having snowing modifiers, may have gloves as a designated item in the clothing recommendation. The assistant application 170 compares the clothing profile to the weather profile to determine whether the clothing selection is compatible with the weather data. In some embodiments, an incompatibility is identified if the temperature rating of the clothing profile does not match that of the weather profile or if a designated item in the weather profile is not included in the clothing selection.

In some embodiments, the determination of weather and clothing compatibility of method block 220 may be performed for the present time. In some embodiments, the determination of weather and clothing compatibility of method block 220 may be performed for a future time. For example, if a weather transition is predicted later in the day an incompatibility is generated for the future time. The future time may be associated with a calendar event on a user schedule maintained by the assistant application 170 or based on the user's normal pattern (e.g., coming home from place of employment).

In method block 225, the assistant application 170 generates a notification message 180 (see FIG. 1) on the device 100 responsive to the clothing selection being incompatible with the weather data in method block 220. In some embodiments, the notification message 180 is provided as a message on the display 115. In some embodiments, the notification message 180 is provided as a voiced message on the speaker 125.

The content of the notification message 180 depends on the nature of the incompatibility. In some embodiments, the notification message 180 includes a suggestion to take an additional clothing item ("Consider taking your gloves.") 164 or leave a clothing item 164 behind ("No rain is predicted. Consider leaving your umbrella behind."). The notification message 180 may also indicate the future time recommendation ("It is predicted to be colder this evening. Consider taking a warmer jacket.").

In some embodiments, the assistant application 170 queries the user regarding preference data when incompatibilities are identified. For example, if the assistant application 170 recommends a warmer coat, the user may provide user input to the assistant application 170 indicating that the selected coat is suitable for the associated weather profile. In this manner, the user preference data may be includes in the clothing item inventory list and the potential incompatibility may be suppressed in the future.

In some embodiments, the assistant continues to receive and analyze the weather data 175 to identify changes. If a weather change is identified in method block 230, the assistant application 170 repeats the elements of method block 220 to determine if a notification message 180 should be generated based on the new weather profile associated with the change and the clothing selection.

In some embodiments, certain aspects of the techniques described above may be implemented by one or more processors of a processing system executing software. The techniques may be implemented by executing software on a computing device, such as the processor 105 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 110 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices, such as Flash memory, a cache, random access memory (RAM), or other non-volatile memory device or devices and the like. The executable instructions stored on the non-transitory computer readable storage medium may be in source code, assembly language code, object code or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes receiving weather data in a device, identifying a clothing selection by a user in the device, and generating a first notification message on the device responsive to the clothing selection being incompatible with the weather data.

A device includes a display and a processor coupled to the display to receive weather data, identify a clothing selection by a user, and generate a first notification message on the display responsive to the clothing selection being incompatible with the weather data.

A device includes a first transceiver, an interrogator, and a processor coupled to the interrogator and the first transceiver. The processor is to store a user address associated with a particular user of a device in a first transceiver identification field stored on a first identification tag of a first smart object of a first type, enable the interrogator to read a second identification tag attached to a second smart object of the first type, wherein a second transceiver identification field is stored on the second identification tag, store the user address in the second transceiver identification field using the interrogator responsive to determining that the second radio identification field has a default value, and establish a connection between the first transceiver and the second smart object based on the user address.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
receiving a first set of weather data associated with a first time period in a device at a first time;
identifying a clothing selection by a user using at least one sensor in the device;
generating a first notification message on the device responsive to the clothing selection being incompatible with the first set of weather data during the first time period;
receiving a second set of weather data associated with at least a portion of the first time period at a second time after the first time, the second set of weather data indicating a weather condition change for the portion of the first time period compared to the first set of weather data; and
generating a second notification message on the device indicating the weather condition change, wherein the second notification message comprises a message regarding the compatibility of the clothing selection in view of the weather condition change.

2. The method of claim 1, wherein the sensor comprises an interrogator, and identifying the clothing selection comprises reading clothing type data from an identification tag associated with a clothing item using the interrogator.

3. The method of claim 1, wherein the sensor comprises a microphone, and identifying the clothing selection comprises:
generating an audio signature using the microphone; and
identifying the clothing selection based on the audio signature.

4. The method of claim 1, further comprising:
identifying a calendar event on the device;
identifying a portion of the weather data corresponding to a time frame of the calendar event; and
generating the first notification message on the device responsive to the clothing selection being incompatible with the weather data in the time frame of the calendar event.

5. The method of claim 1, further comprising determining the clothing selection is incompatible with the weather data by comparing a temperature rating of the clothing selection to temperature data in the weather data.

6. The method of claim 5, further comprising adjusting the temperature rating based on user preference data.

7. The method of claim 1, further comprising determining the clothing selection is incompatible with the weather data by determining a particular item is absent from the clothing selection, wherein the first notification message includes a recommendation for the particular item.

8. A device, comprising:
 a display;
 a sensor; and
 a processor coupled to the display and the sensor to receive a first set of weather data associated with a first time period at a first time, identify a clothing selection by a user using the sensor, generate a first notification message on the display responsive to the clothing selection being incompatible with the weather data during the first time period, receive a second set of weather data associated with at least a portion of the first time period at a second time after the first time, the second set of weather data indicating a weather condition change for the first time period compared to the first set of weather data, and generate a second notification message on the display indicating the weather condition change, wherein the second notification message comprises a message regarding the compatibility of the clothing selection in view of the weather condition change.

9. The device of claim 8, wherein the sensor comprises an interrogator coupled to the processor, and the processor is to identify the clothing selection by using the interrogator to retrieve clothing type data read from identification tags associated with one or more clothing items.

10. The device of claim 8, wherein the sensor comprises a microphone coupled to the processor, wherein the processor is to generate an audio signature using the microphone of the device and identify at least one item in the clothing selection based on the audio signature.

11. The device of claim 8, wherein the processor is to identify a calendar event on the device, identify a portion of the weather data corresponding to a time frame of the calendar event, and generate the first notification message on the display responsive to the clothing selection being incompatible with the weather data in the time frame of the calendar event.

12. The device of claim 8, wherein the processor is to determine the clothing selection is incompatible with the weather data by comparing a temperature rating of the clothing selection to temperature data in the weather data.

13. The device of claim 12, further comprising adjusting the temperature rating based on user preference data.

14. The device of claim 8, wherein the processor is to determine the clothing selection is incompatible with the weather data by determining a particular item is absent from the clothing selection, and wherein the first notification message includes a recommendation for the particular item.

15. The device of claim 8, further comprising a speaker coupled to the processor, wherein the processor is to generate the notification message on the speaker.

* * * * *